Dec. 28, 1965 V. F. ARPAJIAN 3,225,963
HOPPER APPARATUS AND METHOD
Filed Dec. 7, 1964 3 Sheets-Sheet 1

INVENTOR
VASKEN F. ARPAJIAN
BY Seidel & Gonda
ATTORNEYS.

Dec. 28, 1965   V. F. ARPAJIAN   3,225,963
HOPPER APPARATUS AND METHOD

Filed Dec. 7, 1964   3 Sheets-Sheet 2

INVENTOR
VASKEN F. ARPAJIAN
BY Seidel & Gonda
ATTORNEYS.

Dec. 28, 1965  V. F. ARPAJIAN  3,225,963
HOPPER APPARATUS AND METHOD
Filed Dec. 7, 1964  3 Sheets-Sheet 3
FIG.3
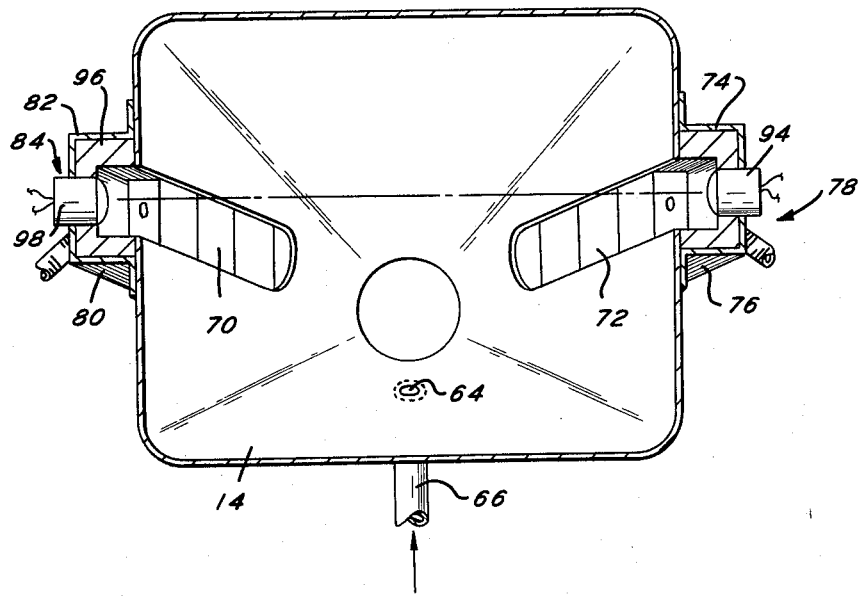
FIG.4
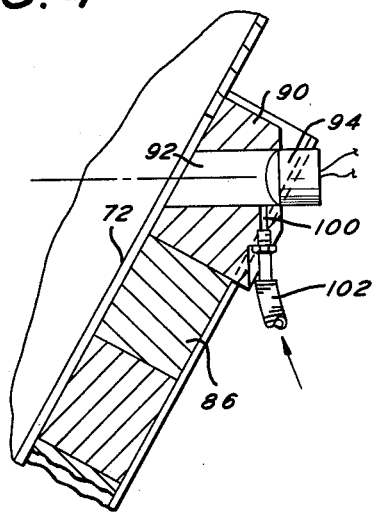
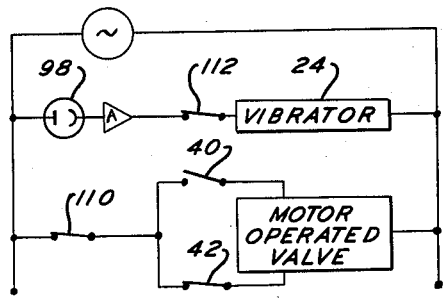
FIG.5
INVENTOR
VASKEN F. ARPAJIAN
BY Seidel & Gonda
ATTORNEYS.

United States Patent Office 3,225,963
Patented Dec. 28, 1965

3,225,963
HOPPER APPARATUS AND METHOD
Vasken F. Arpajian, Philadelphia, Pa.
(% F. J. Stokes Co., 5500 Tabor Road, Philadelphia, Pa.)
Filed Dec. 7, 1964, Ser. No. 416,514
10 Claims. (Cl. 222—1)

This invention relates to a hopper apparatus and method, and more particularly, a hopper apparatus and dispensing method adapted to feed non free flowing flaky, powdery or granular materials to plastics molding presses.

Flaky, powdery or granular materials used in molding processes are difficult to delivery to the molding apparatus. The material has the tendency to cake in the delivery hopper or form a bridge across the outlet of the delivery hopper, particularly where passageways through which material must flow are limited in dimensions by other necessary design considerations. If the material bridges or cakes as it is fed to the molding press, the molded article will flake and/or be formed with voids and in the case of complete bridging, production is halted.

Accordingly, it is an object of the present invention to provide a hopper apparatus and method for feeding, flaky, powdery or granular material to plastics molding presses.

Another object of this invention is to provide a hopper apparatus for feeding flaky, granular or powdery material to plastics molding presses and which includes stuffing and agitation means to prevent the material within the hopper apparatus from caking or bridging.

A still further object of the present invention is to provide a hopper apparatus with automatic control to maintain a predetermined level of material within the hopper apparatus in order to prevent material within the hopper from piling up outside of the range of the agitating means associated with the hopper, thereby preventing bridging, or caking of the material within the hopper.

Other objects will appear from the disclosure which follows:

For the purpose of illustrating the invention, there is shown in the drawings a form which is presently preferred; it being understood, however, that this invention is not limited to the precise arrangements and instrumentalities shown.

FIGURE 3 is a cross-sectional view taken substantially along the plane indicated by the line 3—3 of FIGURE 2.

FIGURE 4 is a cross-sectional view taken substantially along the plane indicated by the line 4—4 of FIGURE 1.

FIGURE 5 is a schematic illustration of wiring to effect a control means for delivery of material to the hopper.

Figure 1:
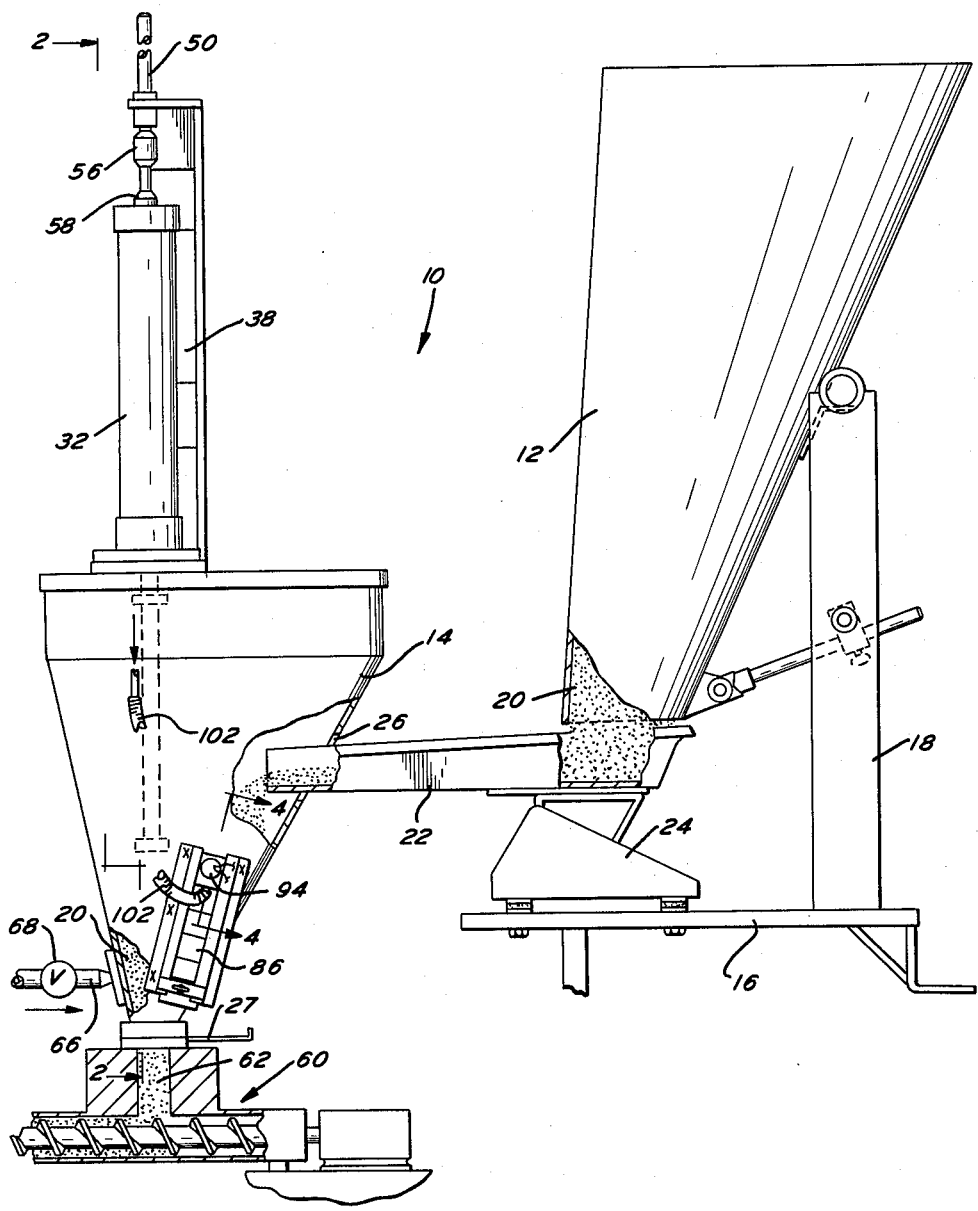
FIGURE 1 is a side view in elevation, partly in section, of the hopper apparatus comprising the subject matter of the present invention.

Referring now to the drawings in detail, wherein like numerals indicate like elements, the hopper apparatus of the present invention is generally designated by the numeral 10.

The hopper apparatus 10 includes a feed hopper 12 and a delivery hopper 14. The delivery hopper 14 is adapted to deliver flaky, powdery or granular material 20 to an extruder scew of a plastics molding press 60 through an orifice 62 communicating with the throat or outlet of the delivery hopper 14.

The material 20 is initially disposed within the feed hopper 12. The material 20 gravitates through the bottom of the hopper 12 onto a vibratory feed table 22. The feed table 22 is mounted upon a vibratory support 24 which induces vibrations in the table 22. The vibrations induced in the table 22 maintain the granular material 20 in a fluid state. The vibratory support 24 is supported upon a stationary frame 16. Spaced standards 18 mounted on the stationary support 16 mount the feed hopper 12.

The vibrations induced in the table 22 not only maintain the material 20 in a fluid state, but cause the material 20 to flow towards the delivery hopper 14. The discharge end of the vibratory feed table 22 projects through an aperture 26 in the delivery hopper 14 and is disposed within the interior of the delivery hopper 14. Any equivalent device could be used for table 22.

The granular material delivery to the delivery hopper 14 by the vibratory feed table 22 accumulates in the throat of the delivery hopper 14. When the closure slide 27 disposed within the throat of the delivery hopper 14 is opened, material is adapted to be fed through the orifice 62 to the press 60.

Figure 2:
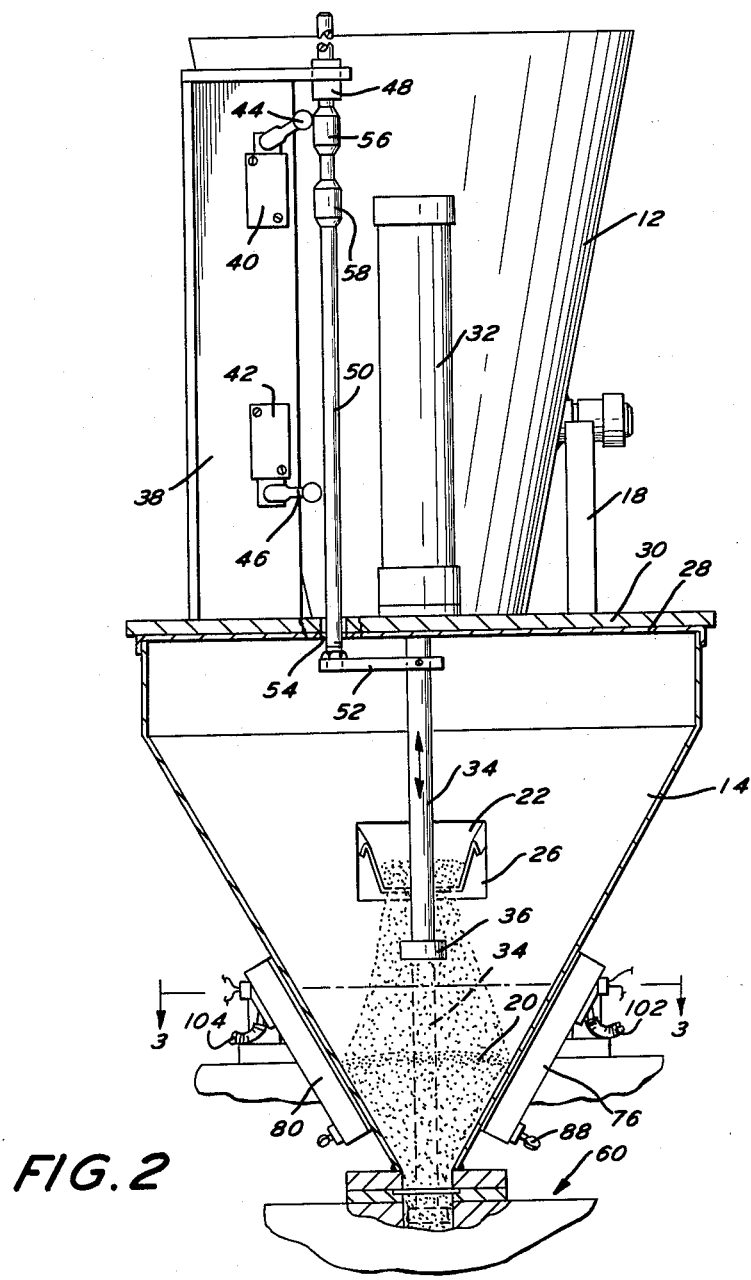
FIGURE 2 is a cross-sectional view taken substantially along the plane indicated by the line 2—2 of FIGURE 1.

The delivery hopper 14 may be closed by a cover element 28. Secured to the cover element 28 is a support plate 30. Mounted upon the support plate 30 is a fluid motor generally designated by the numeral 32. The fluid motor includes a piston rod 34 projecting into the interior of the hopper 14 and terminating in a stuffer head 36. Upon advancing of the piston rod 34 and stuffer head 36 by means of the fluid motor 32, as shown in phantom in FIGURE 2, the material 20 is adapted to be delivered under pressure through orifice 62 into the press 60 and on the return stroke material in the hopper throat is agitated and bridging minimized by nature of the projecting diameter of stuffer head 36 over piston rod 34, causing material to upset.

In order to effect reciprocation of the piston rod 34 and stuffer 36, a switch actuator rod 50 extending through an aperture 54 through the support plate 30 and cover 28 is connected by means of a bracket 52 to the piston rod 34. The actuator rod is adapted to slide through a bushing 48 mounted on the outer end of an L-shaped standard 38 secured to the support plate 30. Mounted at spaced points along the actuator rod 50 is an upper switch actuator 56 and a lower switch actuator 58. Secured at spaced points to the L-shaped standard 38 are a pair of micro-switches 40 and 42. The switch 40 includes a contact arm 44 and the switch 42 includes a contact arm 46.

As the piston rod 34 moves downwardly, it will carry the actuator rod 50 with it by means of the connecting bracket 52. When the piston rod 34 and stuffer head 36 reach the lowermost portion of their stroke, the lower switch actuator 58 on the actuator rod 50 will strike the contact arm 46 to actuate the micro-switch 42. Actuation of the micro-switch 42 will cause the fluid motor 32 to reverse its driving direction. Fluid will be admitted into the cylinder of the fluid motor 32 beneath its piston to cause the piston rod 34 to move upwardly. When the piston rod 34 reaches its uppermost position during its reciprocal stroke, the upper switch actuator 56 on the switch actuating rod 50 will make contact with the contact arm 44 and actuate the micro-switch 40. Actuation of the micro-switch 40 will cause fluid to be admitted to the cylinder of the fluid motor above the piston in the motor. This will cause the piston rod 34 to reverse its direction of movement and move downwardly once again. The supply and exhaust of fluid for motor 32 is controlled by a motor operated supply and exhaust valve which in turn is controlled by switches 40 and 42.

In the foregoing manner, it will be apparent that the piston rod 34 and stuffer head 36 can be continuously reciprocated within the interior of the delivery hopper 14. This will cause agitation of the flaky, granular or powdery material 20 within the delivery hopper 14 to maintain the same in a fluid state and at the same time push or otherwise cause delivery of the material 20 through the throat of the hopper 14 and orifice 62 of the press 60.

Since it is still possible that some of the granular or powdery material 20 may cake or bridge across the throat of the hopper on either side of the piston rod 34, an auxiliary agitation means is provided. An air inlet orifice 64 is provided below the predetermined level of material within the throat of the hopper 14. An air delivery nozzle 66 extends into the orifice 64. When the valve 68 connecting the nozzle 66 to a source of compressed air is opened, air can be admitted into the interior of the hopper 14 below the predetermined level of the material 20 disposed therein. A continuous supply of air admitted into the hopper will maintain the material 20 on both sides of the piston rod 34 in a fluid state and prevent bridging and caking of the material. A cyclic supply of air in the nature of a puff only during the period that piston rod 34 is on its up stroke can serve to break up bridging of flaky materials in hopper 14 so that they can be pushed downwardly by head 34 on its down stroke. In this case, valve 58 is responsive to a switch controlled by rod 34.

It is also desirable to maintain the level of the material disposed within the hopper 14 well below the point at which effective agitation by means of the piston rod 34 and stuffer head 36 can take place. If flaky material is allowed to accumulate in the hopper 14 in too great a pile, the material will bridge despite stirring caused by the piston rod 34 and air agitation mentioned in preceding paragraph.

Accordingly, a pair of elongated slots 70 and 72 are formed in the wall of the hopper 14. A pair of facing Z-shaped plates 74 and 76 are mounted on the exterior of the hopper on either side of the slot 72 to form a channel 78. Similarly, a pair of oppositely facing Z-shaped plates 80 and 82 are mounted on the exterior of the hopper 14 on either side of the slot 70 to form a channel 84. A plurality of blocks 86 are disposed within each of the channels 78 and 84. The lowermost block in each series of blocks is retained within its corresponding channel by means of a set screw or clamping screw 88.

One block 90 in each series of blocks is provided with an opening 92 extending therethrough. Mounted within the opening 92 in block 90 within the channel 78 is a light source 94. Mounted within the opening 92 in block 96 disposed within the channel 84 is a photoelectric cell 98.

The distance from the bottom of the hopper 14 to the height of the photoelectric cell and light source determines the predetermined level of the granular material 20 which can be disposed within the hopper 14. Normally, the photoelectric cell 98 is continuously activated by light emanating from hte light source 94. However, if the material within the hopper should pile up to a level which blocks the light emanating from the light source 94, the supply of current to vibratory support 24 is interrupted to prevent further material from being fed from the table 22 into the hopper 14. Normally, closed manual switches 110 and 112 are provided as illustrated in FIGURE 5. The maximum level of the material within the hopper 14 may be varied by merely exchanging positions of photoelectric cell 98 and light source 94 with the blocks 86 from each of the channels 78 and 84.

The piston rod 34 is disposed to one side of a straight line between light source 94 and photoelectric cell 98 so as not to inadvertently deactivate the cell 98 when reciprocated. In order to insure that light be transmitted from the light source 94 and is received by the photo electric cell 98, and that neither cell is covered by the fine flaky, powdery or granular material 20 as it falls from the table 22, an air duct 100 is formed in each block 90 and 96. It will be noted that ducts 100 do not interfere with the ability of block 86 being on top of block 90 if a lower accumulation level is desired. The air ducts 100 are in communication at one end with the slots 92 slightly in advance of the light source 94 and photoelectric cell 98. At their opposite ends, the air ducts 100 are connected to air hoses 102 and 104. Compressed air may be supplied to the hoses 102, 104 and ducts 100 to keep clean the lenses of the light source 94 and photoelectric cell 98 as well as the passage defined by slot 92 to prevent accidental cut-off of electricity supplied to the vibratory support 24.

A typical flaky material for which the present invention is particularly suited is flock fibers or resin impregnated fabrics having an irregular shape about the size of corn flakes. For such flaky material, I have found that best results were attained when the height of material 20 was controlled so as between about 3 and 5 inches.

The present invention may be embodied in other specific forms without departing from the spirit or essential attributes thereof and, accordingly reference should be made to the appended claims, rather than to the foregoing specification as indicating the scope of the invention.

I claim:

1. Apparatus comprising a hopper having an outlet, feeding means for supplying material to said hopper, control means coupled to said hopper and said feeding means to interrupt the supply of material from the feeding means to the hopper when the level of material in the hopper is above a predetermined level, and means associated with the hopper for agitating the material in the hopper to prevent the material therein from bridging, said agitating means including a member movably mounted in the hopper for up and down movement above and below said control means, said member moving from a position above the control means to a point adjacent said outlet, and a nozzle for introducing pressurized air into the hopper below the predetermined level to keep the material fluffy.

2. Apparatus comprising a hopper having an outlet, feeding means for supplying material to the hopper, control means coupled to said feeding means to interrupt feeding material to the hopper when the level of material in the hopper is above a predetermined level, a member mounted in the hopper for movement toward and away from said outlet for agitating material in the hopper, a nozzle means coupled to the hopper below the predetermined level for intermittently introducing pressurized air into the hopper during movement of the member in a direction away from the outlet.

3. A method of dispensing materials difficult to deliver to a molding press comprising transferring material to a hopper, agitating the material in the hopper, mechanically pushing the material in the hopper toward an outlet on the hopper, continually detecting the level of material in the hopper, temporarily interrupting said transferring of material when the level in the hopper is above a predetermined level, and introducing air into the material below the predetermined level.

4. A method in accordance with claim 3 wherein said agitating step includes moving a member toward and away from the outlet, and introducing air only when the member is moving away from the outlet.

5. Apparatus comprising a hopper, said hopper having opposed vertically disposed slots, channel members affixed to the outside of said hopper alongside said slots, a plurality of blocks within said channel members enclosing said slots, a photo-electric cell associated with one of said blocks, a light source associated with another of said blocks at the slot opposite to said light source, said photoelectric cell and light source being adjustable to a variety of predetermined levels by interchanging said blocks, feeding means for supplying material to said hopper, means responsive to said photoelectric cell to interrupt the supply of material from the feeding means to the hopper when the level of material in the hopper is above the predetermined level of said cell, and means associated with the hopper for agitating the material in the hopper to prevent the material from bridging.

6. Apparatus in accordance with claim 5 including a screw type extruder having its inlet coupled to said hopper to receive material therefrom, and said agitating means including a rod mounted for movement toward and away from the extruder to assist in pushing the material toward the extruder.

7. Apparatus in accordance with claim 5 including a fluid operated actuator for said agitating means.

8. Apparatus comprising a hopper having an outlet, feeding means for supplying material to said hopper, control means coupled to said hopper and said feed means to interrupt the supply of material from the feeding means to the hopper when the level of material in the hopper is above a predetermined level, means associated with the hopper for agitating the material in the hopper to prevent the material therein from bridging, said last-mentioned means being an upright rod member movably mounted in the hopper for up and down movement, said rod having a stuffer foot at its lower end, said stuffer foot having an upper operative position above the level of said material, and a lower operative position in juxtaposition to said outlet.

9. Apparatus in accordance with claim 8 wherein said stuffer foot, when in said lower operative position extends into said outlet to force material therethrough.

10. Apparatus in accordance with claim 9 wherein said rod member is oriented approximately axially of said hopper and in alignment with said opening.

References Cited by the Examiner
UNITED STATES PATENTS

| | | | |
|---|---|---|---|
| 1,978,589 | 10/1935 | McFarlane | 250—238 X |
| 2,370,709 | 3/1945 | Barton | 222—234 |
| 2,381,505 | 8/1945 | Lindholm | 222—56 |
| 2,592,847 | 4/1952 | Babicz | 250—338 |
| 2,638,248 | 5/1953 | Alvord | 222—56 |
| 2,674,396 | 4/1954 | Peterson | 222—56 |
| 2,759,614 | 8/1956 | Stock | 222—55 |
| 2,939,494 | 6/1960 | Haver | 222—56 X |
| 3,091,368 | 4/1963 | Harley et al. | 222—56 |
| 3,104,030 | 9/1963 | Howlett | 222—56 X |
| 3,166,222 | 1/1965 | Schrader | 222—195 |

FOREIGN PATENTS 801,304 9/1958 Great Britain.

LOUIS J. DEMBO, *Primary Examiner.*

HADD S. LANE, *Examiner.*